May 29, 1934.  J. MANO  1,960,249

PIPE JOINT

Filed April 27, 1929

INVENTOR
John Mano
BY
ATTORNEY

Patented May 29, 1934

1,960,249

UNITED STATES PATENT OFFICE 1,960,249

PIPE JOINT

John Mano, Flushing N. Y., assignor, by mesne assignments, to Hilmanco Inc., New York, N. Y., a corporation of New York Application April 27, 1929, Serial No. 358,496

3 Claims. (Cl. 285—114)

This invention relates to pipe joints designed to be effectively sealed against leakage of material through the joint, and to be sealed against the attack of moisture and other corroding elements of the soil and atmosphere. My invention is applicable to all types of pipe joints, such as screw joints, flanged joints, bell and spigot joints, telephone cable joints and substantially all types of pressure or vacuum joints.

While it has heretofore been possible with more or less efficiency and over a reasonable period to make a high pressure, screwed pipe joint, or flanged pipe joint, fairly tight against leakage of certain types of material, such as steam, water and the like, other materials, such as gas, drip oil, or hot or cold oils. sewage and similar substances are of such an insidious nature that they attack the composition used for making the joint tight, and ultimately allow leakage. One of the greatest difficulties in the production and distribution for instance, of illuminating gas is the difficulty in making joints in the pipe line therefor permanently tight. Even lead calking does not make the joint permanently tight. The gas industry has thereby suffered losses running into enormous sums annually through leakage of the gas through the pipe joints, and lives have been lost through this cause. Screw joints are quite practical, and have been proven fairly satisfactory for the smaller sizes of the various types of pipe lines such as soil lines, gas, steam, water and oil lines.

A bell and spigot joint such as has long been used would be the most satisfactory for all sizes of pipe, provided that it could be made permanently tight. One of the most frequently used methods of making the bell and spigot joints of various types tight, has been the use of calking consisting of jute, oakum, lead wool, or similar material, upon which is poured molten lead, in such a manner as to fill up the space in the bell around the spigot. The molten lead, when solidified, must later be calked tight with a suitable tool.

This type of joint has proven more or less satisfactory, but is open to the objections that the lead contracts after it has solidified, and that it is practically impossible to calk more than about an inch or so of the depth of the lead, that it does not adhere properly to the pipe, that there are differences in the coefficients of expansion and contraction of the lead and pipe, that the lead loosens in the joint due to such differences in expansion and due to vibration.

Cements have also been used to some extent for filling the bell of the bell and spigot joint, but these cements are also subject to the disadvantage of being inelastic and comparatively brittle, so that even a slight contraction or subsidence of the pipe, or a shock or jar, or vibration caused by traffic may cause leakage due to the cracking of the cement or the separation of the cement from the surrounding pipes, or even ultimate contraction of the cement itself.

There has therefore existed for a great number of years, an insistent demand for a pipe joint which will remain permanently tight, which can be simply and economically made, which is sufficiently elastic so as not to fail under normal jars or shocks, or under subsidence of the pipe, and which is impervious to moisture, sewage, gas, drip oil, gas liquors and oils, and which is permanently effective.

While many types of cements, such as Portland and bituminous cements have heretofore been suggested for this purpose, insofar as I am aware, no one has ever previously suggested the use of, or has used Sorrel's cement, (an oxychloride of certain metals), for this purpose. I have found that Sorrel's cement, when properly made, with or without other ingredients, is an ideal sealing agent for a pipe joint, possessing long sought advantages and meeting all the severe requirements of practical use.

The composition of Sorrel's cement is well known, and explained in United States patents, No. 53,092, dated March 6th, 1866, and No. 100,945, dated March 15th, 1870. It is a hydraulic cement, being sufficiently impervious to water and moisture to make the joint proof thereagainst. Many uses have been found for it as set forth in the patents referred to. It is sufficiently elastic to give with the pipe under jars or shocks such as distant explosions, or heavy traffic or subsidence of the pipe. It has the property of expanding on hardening or setting, which is extremely important in connection with pipe joints. If a test tube is filled with the cement, the expansion is sufficiently great on hardening or setting to break the tube. If a joint is filled with the cement in a paste or liquid form, the cement on hardening or setting, expands to such an extent as to prevent possibility of leakage.

Sorrel's cement after setting, is dense and hard, and is also impervious to the attack of sewage, salt water, gas, many chemicals, drip oil, gas liquors and oils but this property has never before been utilized, insofar as I have been able to discover. It also adheres to the pipes with great tenacity.

It is fireproof, non-conductive of electricity and has insulating properties and therefore has a decidedly advantageous effect in pipe joints by tending to prevent electrolytic action, which often occurs due to soil conditions or to the proximity of electrical power or high tension lines.

Due to the old and to the newly discovered properties above set forth, I have found by numerous exhaustive and lengthy tests that a pipe joint made with Sorrel's cement has produced results heretofore thought impossible, and which have been sought for generations in the art of making pipe joints, particularly, for pipes of large sizes. The universal approval which my improved joint has met indicates that my joints will soon displace most other types of sealed joints, particularly, in the gas, oil and telephone industries.

The various objects of my invention will in part, be apparent from the above, and in part clear from the description which follows and from the drawing, wherein, Fig. 1 is a combined section and elevation of a pipe joint, such as is peculiarly adapted for use in telephone lines.

In that practical embodiment of my invention which I have illustrated by way of example, I apply Sorrel's cement in a fluid state to the threads, flanges and gaskets of screw joints and flanged joints, respectively, and also fill the interstices in and between the pipes to be joined with this cement, in a manner which has been heretofore customary with other types of cements.

Figure 1:
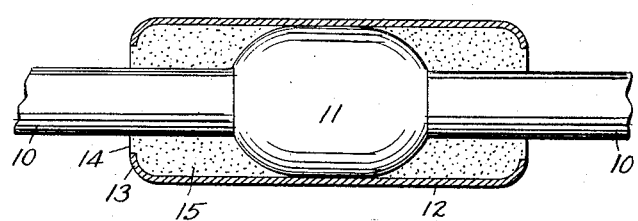

As illustrated in Fig. 1, my improved pipe joint when applied to telephone lines, comprises the usual lead pipes 10, spaced apart and carrying therein the various wires, which are spliced together and covered with fabric or the like to form the spliced enlargement 11. A suitable sleeve as 12 of greater length than the enlargement 11 and of slightly greater interior diameter than the outer diameter of said enlargement is arranged over the enlargement and projects over the adjacent ends of the pipes 10. The ends 13 of said sleeve 12 are then preferably though not necessarily bent inwardly toward the pipe 11, to somewhat constrict the opening 14 thereof, after which the Sorrel's cement 15 in a paste or fluid state is used to fill the space between the sleeve 12 and the pipes 10.

The cement replaces the lead wiped joints which are used to seal the ends of joints of this type, and insures against the attack or entrance of moisture into the splices at the enlargement 11.

By expanding during hardening or setting, the cement fills all the interstices of and tightens the joint, and adheres firmly to all the parts.

Figure 2:
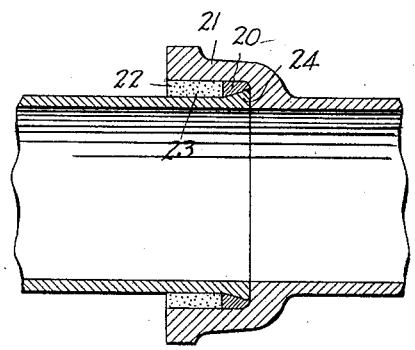
Fig. 2 is a section of a bell and spigot joint embodying my invention.

In the bell and spigot joint shown in Fig. 2, after the spigot has been assembled in proper position to the bell, calking material as 20 is inserted at the bottom of the bell 21, and rammed into place in the usual manner. The calking material may first be dipped or impregnated with Sorrel's cement, if desired. The Sorrel's cement 22 is then poured or troweled into the space 23 between the bell 21 and spigot 24 after which another ring of packing material may be used, and then another ring of cement, if desired.

Figure 3:
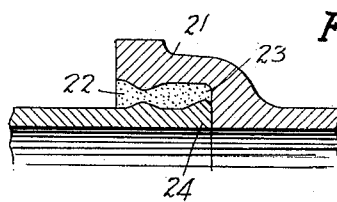
Fig. 3 is a similar view of another form of bell and spigot joint to which my invention has been applied.

In Fig. 3, I have shown the joint filled and sealed without the use of any packing or calking material whatsoever, the cement 22 filling the entire space 23 between the bell 21 and the spigot 24.

Figure 4:
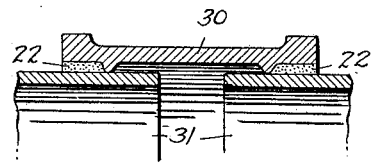
Fig. 4 is a similar view of another form of joint.

In Fig. 4, the sleeve 30 is arranged over the ends 31 of the pipes to be joined and the space between the sleeve and the pipes filled with the Sorrel's cement.

It will be understood that my improved joint is far more efficient than previously known joints, by reason of its hydraulic, elastic, expansive, insulating, and resistant properties, as hereinbefore described.

It will further be understood that while I have shown and described three typical types of pipe joints to which my invention has been applied, I do not intend to be understood as limiting myself thereto but intend to use my invention with all types of pipe joints wherein a sealing compound is necessary or advisable, and that I intend to claim my invention as broadly as may be permitted by the state of the prior art and the terms of the appended claims.

I claim:

1. A pipe joint comprising a pair of aligned pipes, an enlargement between and joining the ends of the pipes, a sleeve arranged coaxially about the enlargement, inwardly bent ends on the sleeve, and oxychloride of magnesium cement filling the interior of the sleeve.

2. A pipe joint comprising a pair of aligned and longitudinally spaced pipes, a sleeve arranged coaxially of and about the ends of the pipes, and providing a pair of annular spaces between the sleeve and said pipes, inward projections on the sleeve each extending toward said pipes and thereby constricting the spaces, and Sorrel's cement filling the constricted spaces and terminating at the projections.

3. In a pipe joint, a pipe, a second coaxially arranged pipe, the ends of said pipes being in spaced relation, a sleeve arranged concentrically of and about said pipes and providing a pair of annular spaces between the inner surface of the sleeve and the outer surfaces of said pipes, a pair of annular spaced projections extending inwardly from said sleeve toward said pipes and thereby constricting said spaces, and a pair of spaced rings of oxychloride of magnesium filling said spaces and adhering directly to the outer surfaces of said pipes and to the inner surface of said sleeve with sufficient tenacity to secure the sleeve to the pipes and thereby to join said pipes together and to seal said pipes against leakage of material therefrom and against the entrance of material thereinto at the joint therebetween.

JOHN MANO.